(12) United States Patent
Kantor et al.

(10) Patent No.: US 10,569,604 B2
(45) Date of Patent: Feb. 25, 2020

(54) TIRE PRESSURE REGULATING DEVICE WITH A PNEUMATICALLY PILOT-CONTROLLED RELAY VALVE

(71) Applicant: KNORR-BREMSE Systeme fuer Nutzfahrzeuge GmbH, Munich (DE)

(72) Inventors: Kornel Kantor, Kecskemet (HU); Janos Toth, Kecskemet (HU); Tamas Toth, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 357 days.

(21) Appl. No.: 15/454,708

(22) Filed: Mar. 9, 2017

(65) Prior Publication Data

US 2017/0174011 A1    Jun. 22, 2017

Related U.S. Application Data

(63) Continuation of application No. PCT/EP2015/070229, filed on Sep. 4, 2015.

(30) Foreign Application Priority Data

Sep. 10, 2014   (DE) .................. 10 2014 113 063

(51) Int. Cl.
*B60C 23/04*    (2006.01)
(52) U.S. Cl.
CPC ................ *B60C 23/0408* (2013.01)
(58) Field of Classification Search
CPC ..... B60C 23/0408; B60C 23/02; B60C 23/04; B60C 23/00; B60C 23/001; B60C 23/003;
(Continued)

(56) References Cited

U.S. PATENT DOCUMENTS 4,645,057 A   2/1987   Schramme et al.
4,724,879 A   2/1988   Schultz et al.
(Continued)

FOREIGN PATENT DOCUMENTS

CN    103025546 A    4/2013
CN    103608196 A    2/2014
(Continued)

OTHER PUBLICATIONS

Machine translation of DE102012008002, 31 pages, 2019 (Year: 2019).*

(Continued)

*Primary Examiner* — Jason R Bellinger
(74) *Attorney, Agent, or Firm* — Crowell & Moring LLP

(57) ABSTRACT

A pressure regulating device is provided for at least one tire of a commercial vehicle, having a relay valve which performs compressed air loading of a working line which leads to the tire starting from a pressure source in accordance with a pneumatic pilot controller which has an electropneumatic converter for converting an electric actuating signal into a corresponding pneumatic pilot control signal for the relay valve. The converter has an electropneumatic aeration valve and an electropneumatic ventilating valve for pneumatic signal specifying for increasing or reducing the tire pressure. The pneumatic signal specifying takes place according to special regulations.

7 Claims, 1 Drawing Sheet

(58) Field of Classification Search
CPC ........ G07C 5/0808; F15B 19/00; F15B 21/04; F02D 41/22
See application file for complete search history.

(56) References Cited

U.S. PATENT DOCUMENTS

| | | | |
|---|---|---|---|
| 4,754,792 | A | 7/1988 | Braun et al. |
| 4,924,926 | A * | 5/1990 | Schultz ................. B60C 23/003 137/625.2 |
| 2012/0059546 | A1 | 3/2012 | Wilson et al. |
| 2014/0034202 | A1 * | 2/2014 | Voith .................... B60C 23/003 152/415 |
| 2014/0076409 | A1 | 3/2014 | Bernhardt et al. |

FOREIGN PATENT DOCUMENTS

| | | |
|---|---|---|
| CN | 204037244 U | 12/2014 |
| DE | 31 05 037 A1 | 9/1982 |
| DE | 34 05 101 A1 | 8/1985 |
| DE | 31 05 037 C2 | 8/1991 |
| DE | 10 2012 008 002 A1 | 10/2013 |
| DE | 10 2012 106 549 A1 | 5/2014 |
| DE | 10 2012 106 549 B4 | 7/2018 |
| DE | 10 2012 008 002 B4 | 3/2019 |

OTHER PUBLICATIONS

International Search Report (PCT/ISA/210) issued in PCT Application No. PCT/EP2015/070229 dated Nov. 3, 2015 with English translation (five pages).
German-language Written Opinion (PCT/ISA/237) issued in PCT Application No. PCT/EP2015/070229 dated Nov. 3, 2015 (five pages).
International Preliminary Report on Patentability (PCT/IB/326, PCT/IB/338 & PCT/IB/373) issued in PCT Application No. PCT/EP2015/070229 dated Mar. 23, 2017, including English translation of document C2 (German-language Written Opinion (PCT/ISA/237)) previously filed on Mar. 9, 2017 (six pages).
Chinese-language Office Action issued in counterpart Chinese Application No. 201580060646.1 dated May 28, 2018 with English translation (11 pages).
Indian-language Office Action issued in counterpart Indian Application No. 201737008059 dated May 2, 2019 with English translation (seven (7) pages).

* cited by examiner

TIRE PRESSURE REGULATING DEVICE WITH A PNEUMATICALLY PILOT-CONTROLLED RELAY VALVE

CROSS REFERENCE TO RELATED APPLICATIONS

This application is a continuation of PCT International Application No. PCT/EP2015/070229, filed Sep. 4, 2015, which claims priority under 35 U.S.C. § 119 from German Patent Application No. 10 2014 113 063.4, filed Sep. 10, 2014, the entire disclosures of which are herein expressly incorporated by reference.

BACKGROUND AND SUMMARY OF THE INVENTION

The invention relates to a tire pressure regulating device for at least one tire of a utility vehicle, having a pneumatically pilot-controlled relay valve which performs compressed air loading of a working line which starts from a pressure source and leads to the tire, in accordance with a pneumatic pilot controller which includes an electropneumatic converter for converting an electrical actuation signal into a pneumatic pilot control signal, corresponding to a setpoint tire pressure, for the relay valve. Furthermore, the invention also relates to methods for inflating at least one tire of a utility vehicle with such a tire pressure regulating device.

The field of application of the invention extends predominantly to utility vehicles which are used under different travel route conditions such as paved roads, off-road, sand, marshy ground and the like. These conditions require the tire pressure to be adapted to different conditions of the underlying surface even during travel. Therefore, in the utility vehicles which are of interest here there is a tire inflation device which adapts the actual (ACT) tire pressure which is present in the tires of the utility vehicle to a setpoint (SETPOINT) tire pressure which is predefined depending on the conditions of the underlying surface. Such a tire inflation device is usually a component of a pneumatic system of the utility vehicle which can also comprise a pneumatic brake system and, if appropriate, a pneumatic suspension spring system.

Tire inflation devices which use an aerating valve or a venting valve with a high throughflow rate to perform compressed air loading of one or more tires can be found in the generally known prior art. Depending on the ACT tire pressure which is measured by use of sensor technology, a difference in pressure compared to a predefined desired SETPOINT value is determined, in order to adapt the tire pressure subsequently. A selection of the tire to be inflated from a multiplicity of tires of a vehicle is made here by way of selection valves which establish a connection between the tire to be inflated and the valve device. In most applications, the aerating valve is connected in series with the venting valve and the valves are actuated either manually or electrically.

DE 34 05 101 A1 discloses, in contrast with the above, a tire pressure regulating device which is of the generic type and which makes use of a relay valve for tire inflation. The tire inflation device consists of a valve system in which solenoid valves and relay valves are functionally connected to one another. In accordance with the switched position of a manual control switch, regulating functions, which bring about an increase or decrease in the tire pressure are executed for the predefinition of the setpoint values. When the tire pressure is lowered, the compressed air which flows out of the tire is diverted into the atmosphere via an air outlet of a relay valve which is directly connected to a wheel valve. The predefined setpoint values which are selected manually by the control switch are passed on via an electrical signal line to an electromagnetic converter which actuates the pneumatic pilot controller of the relay valve. Within the scope of this tire inflation device, a sensor for measuring the ACT tire pressure serves only for performing displays and is not a component of a closed-loop regulating circuit.

DE 31 05 037 A1 discloses a tire inflation device with a relay valve, in which electropneumatic pilot control valves are also actuated with a manual setpoint value predefining means. The ACT tire pressure is measured here by a flow sensor. The relay valve and a shut-off valve are connected downstream of a manually settable regulating valve. The measuring principle of such a tire inflation device is represented by way of flow sensors which are arranged downstream of the relay valve in the supply line. With such a technical solution, differences in setpoint value can be compensated extremely promptly by the mechanical regulating components and they require a plurality of approximation steps.

DE 10 2012 008 002 A1 discloses a tire inflation device with a relay valve which is also subject to mechanical regulation. The aerating valve and venting valve which actuate the relay valve are themselves also pneumatically pilot-controlled. In this technical solution, the tire pressure circuit of a multi-circuit compressed air supply system of a utility vehicle is preferably to be supplied with compressed air.

The object of the present invention is to provide a tire inflation device using a pneumatically pilot-controlled relay valve for high through flows, which tire inflation device compensates quickly and precisely for a control error between a measured ACT tire pressure and a predefined SETPOINT tire pressure.

The object is achieved on the basis of a tire pressure regulating device for at least one tire of a utility vehicle, having a relay valve which performs compressed air loading or compressed air venting of a working line which starts from a pressure source and leads to the tire, in accordance with a pneumatic pilot controller which comprises an electropneumatic converter for converting an electrical actuation signal into a pneumatic pilot control signal, corresponding to the SETPOINT tire pressure, for the relay valve. The converter has an electropneumatic aerating valve and an electropneumatic venting valve for predefining pneumatic signal values for increasing or reducing the tire pressure.

In terms of process technology, the object is achieved by a method for regulating the pressure of at least one tire of a utility vehicle, using a relay valve with which compressed air loading or compressed air venting of a working line which starts from a pressure source and leads to the tire is performed in accordance with a pneumatic pilot controller with which an electrical actuation signal is converted, using an electropneumatic converter integrated therein, into a pneumatic pilot control signal, corresponding to the SETPOINT tire pressure, for the relay valve. The pneumatic pilot control signal corresponds to the SETPOINT tire pressure or is predefined as a function of the characteristic of the relay valve in proportion to the SETPOINT tire pressure.

The object is also achieved by a method for regulating the pressure of at least one tire of a utility vehicle, using a relay valve with which compressed air loading or compressed air venting of a working line which starts from a pressure source and leads to the tire is performed in accordance with a pneumatic pilot controller with which an electrical actuation signal is converted, using an electromagnetic converter integrated therein, into a pneumatic pilot control signal, corresponding to the SETPOINT tire pressure, for the relay valve. In the event of a low ACT tire pressure and/or high SETPOINT tire pressure in an initial phase of the aeration which is initiated as a result thereof, the control unit predefines a higher pressure than the SETPOINT tire pressure in order to accelerate the aeration, and/or in the event of a high ACT tire pressure and/or low SETPOINT tire pressure at the start of the venting which is initiated as a result thereof, the lowest possible pressure is predefined by means of the switch-off pressure of the wheel valve in order to accelerate the venting.

The invention includes the technical teaching that the converter has an electropneumatic aerating valve and an electropneumatic venting valve for predefining pneumatic signal values for increasing or reducing the tire pressure. It is preferably provided here that a pressure sensor, which is arranged on the working-line side of the relay valve, measures the profile of the tire pressure and passes on the measurement signal continuously to an electronic control unit for resetting to the predefined SETPOINT tire pressure, for which purpose either the aerating valve or the venting valve is electrically actuated, or both valves are held in the closed state.

The advantage of the solution according to the invention lies, in particular, in the fact that as a result of the continuous closed-loop regulation which is provided it is possible to react quickly to a control error which is to be compensated. Continuous monitoring of setpoint pressure differences which are to be compensated takes place by the continuous monitoring process of the tire pressure. No incremental aerating or venting phases are necessary in order to achieve a setting to the desired SETPOINT tire pressure at the end of the regulating process. The solution according to the invention sets a new pressure value on request, that is to say aerates, if a relatively high SETPOINT tire pressure is required, and vents if a relatively low tire pressure is required. Otherwise, the pilot controller is shut off. In this context, the ACT tire pressure is not measured directly by means of a pressure sensor arranged at the tire but instead the working pressure, which exits on the output side of the relay valve is measured in an analogous fashion in the working line leading to the tire.

The SETPOINT value for aeration or venting can be modified continuously during the aeration or venting with the electronically actuated regulating valve in order to reduce the time required for necessary compensation of the tire pressure.

According to one preferred embodiment of the invention, in the case of a plurality of tires of a utility vehicle, a respectively assigned wheel valve is provided in order to make a selection for one of the tires, for which necessary tire aeration or tire venting has to be carried out. As a result, a single tire inflation device, which adapts, according to requirements, the SETPOINT tire pressure for a plurality of tires connected thereto, is used for a plurality of tires.

The electropneumatic aerating valve and venting valve which predefine the desired control pressure of the relay valve through alternating actuation by the control unit are preferably embodied as monostable electropneumatic 2/2-way valves. As a result, reliable pilot control of the relay valve is achieved with low expenditure in terms of technical equipment.

The tire inflation device of the type described above is preferably actuated by the control unit in such a way that in the event of an excessively low tire pressure at the start of the aeration which initiated as a result thereof, at first a higher pressure than the SETPOINT tire pressure is predefined in order to accelerate the aeration. Conversely, in the event of an excessively high tire pressure the control unit can also predefine, at the start of the venting initiated as a result thereof, the lowest possible pressure above the shut-off pressure of the wheel valve in order to accelerate the venting. The same can also be achieved by an initial offset with respect to the actuation signal of the regulating device. The initial increase or decrease with respect to the SETPOINT tire pressure which is to be set or the control error which represents the manipulated value can be predefined on the basis of a characteristic curve which is stored in the control unit or formed thereby. The preferably linear characteristic curve ensures in the case of aeration that the predefined SETPOINT value drops continuously during the aeration. At the end of the aeration, the SETPOINT tire pressure is then reached. This is also implemented in an analogous fashion for venting.

According to a further measure which improves the invention, the control unit performs signal processing of both the tire pressure measured with the pressure sensor and further measurement signals, originating from the on-board pneumatic system, such as for example the current external temperature, the operating state of the vehicle engine or the current supply pressure value, for determining the pneumatic pilot control signal. An inflation time of the tire is calculated on the basis thereof, in order to carry out the aeration of the tire in the calculated time period. In addition, after modification of the tire pressure and of the further measurement signals of the on-board pneumatic system the electronic control unit can also newly calculate the inflation time, in order to be able to perform dynamic adaptation.

According to another preferred aspect of the invention, the electronic control unit prevents or interrupts the aeration if evaluation of the further measurement signals of the on-board pneumatic system reveals that the execution of a higher priority basic function of the on-board pneumatic system from the compressed air requirement of the tire inflation would be jeopardized. Therefore, the tire pressure regulation can be carried out with the same pneumatic system which, for example, also carries out the vehicle braking which is more important in terms of safety technology, without adversely affecting the function thereof.

The increasing of the aeration or the decreasing of the venting of the tire is preferably stopped by the control unit if the ACT tire pressure which is measured by the pressure sensor has reached at least 90% of the SETPOINT tire pressure. Best loading is carried on by means of the inertias present in the system. As a result, the SETPOINT tire pressure is not exceeded, which would immediately trigger venting of the tire as a result of the system oscillations generated thereby. This permits the SETPOINT value to be achieved in a targeted fashion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
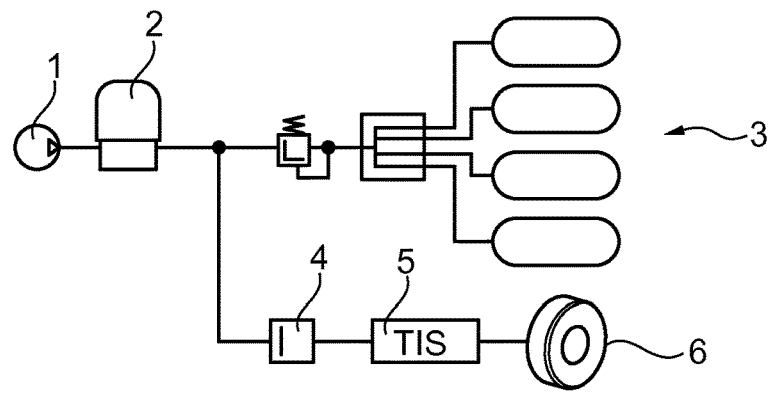
FIG. 1 is a schematic illustration of a compressed air supply system for a utility vehicle.

According to FIG. 1, a compressed air system of a utility vehicle (not illustrated here in more detail) is composed essentially of compressor 1 for generating compressed air from the ambient air (atmosphere), downstream of which compressor 1 an air dryer 2 for removing the moisture from the compressed air is connected. The compressed air which is dried as a result serves to supply various compressed air consumers 3 and, inter alia, also to supply, via a pressure limiting valve 4, a tire inflation device 5 for inflating at least one tire 6 connected thereto.

Figure 2:
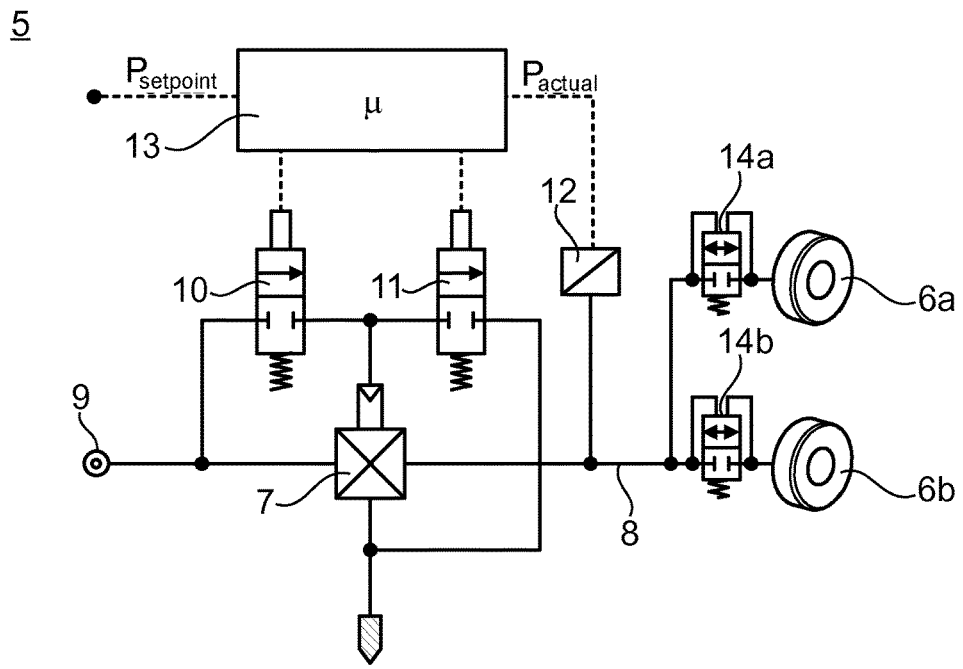
FIG. 2 is a block circuit diagram illustration of a tire inflation device for inflating two tires of a utility vehicle.

According to FIG. 2, the tire inflation device 5 for two tires 6a and 6b which are connected therein is composed essentially of a relay valve 7 which performs compressed air loading of a working line 8 which starts from a supply pressure input 9 and leads to the tire 6a and 6b. The actuation of the pneumatically pilot-controlled relay valve 7 is carried out by an electropneumatic aerating valve 10 and by an electropneumatic venting valve 11. The aerating valve 10 serves to increase the pilot control pressure, which triggers an increase in the tire pressure by the relay valve 7. The venting valve 11 serves to reduce the pilot control pressure, which results in a reduction in the tire pressure. The tire pressure which is present is measured in an analogous fashion by use of a pressure sensor 12 which is arranged on the working line 8 of the relay valve 7. The electrical measurement signal is fed on the input side to an electronic control unit 13. The electronic control unit 13 determines the control error on the basis of the predefined setpoint tire pressure n setpoint and as a result thereof electrically actuates either the aerating valve 10 to generate the tire pressure or the venting valve 11 to reduce the tire pressure. A separate wheel valve 14a or 14b is provided per tire 6a and 6b in order to make a selection of the tire inflation.

The electropneumatic aerating valve 10 and the electropneumatic venting valve 11 are connected in series with one another and are both embodied as a monostable electropneumatic 2/2-way valve. Both valves can be actuated alternately by the control unit 13.

In order to accelerate the aeration, in the case of an excessively low ACT tire pressure at the start of the aeration, the control unit 13 predefines a higher pressure than the setpoint tire pressure $p_{setpoint}$. The same occurs analogously in the case of venting, that is to say regulated reduction of the tire pressure.

Figure 3:
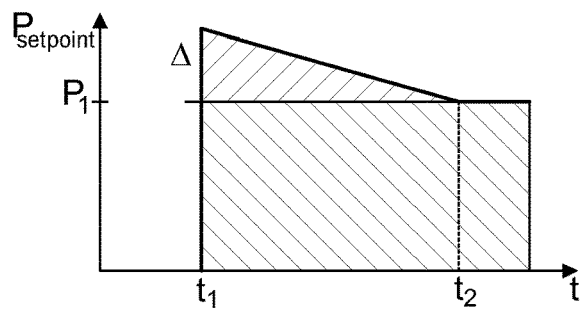
FIG. 3 is a graphic illustration of a SETPOINT value profile with offset for a rapid pressure compensation.

FIG. 3 illustrates a linear characteristic curve which is stored in the control unit 13 and has an initial increase Δ with respect to the setpoint tire pressure which is to be set. This initials increase decreases continuously from the time t1 to the time t2 in this exemplary embodiment until it drops to the level of the predefined setpoint tire pressure p1. The aeration of the tire is stopped by the control unit if the ACT tire pressure which is measured by the pressure sensor 12 has almost reached the setpoint tire pressure. The closed-loop regulating process also includes predefined threshold values in order to avoid overshooting of the regulating system.

The invention is not limited to the preferred exemplary embodiment described above. Rather, refinements thereof which are also included in the scope of protection of the following claims are also contemplated. It is therefore also possible for example to monitor more than two tires with a single tire inflation device and to inflate them with a predefined tire pressure. A corresponding number of wheel valves are to be integrated into the system for this purpose.

LIST OF REFERENCE SYMBOLS

1 Compressor
2 Air dryer
3 Compressed air consumer
4 Pressure limiting valve
5 Tire inflation device
6 Tire
7 Relay valve
8 Working line
9 Forward pressure wave
10 Aerating valve
11 Venting valve
12 Pressure sensor
13 Control unit
14 Wheel valve
$P_{setpoint}$ Setpoint tire pressure
$P_{act}$ Actual tire pressure
p1 Predefined setpoint value
t1 Starting point of predefinition of setpoint values
t2 Time for increase
Δ Increase with respect to predefined setpoint value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of regulating the pressure of at least one tire of a utility vehicle, using a relay valve with which compressed air loading or compressed air venting of a working line extending from a pressure source and leading to the tire is performed in accordance with a pneumatic pilot controller with which an electrical actuation signal is converted into a pneumatic pilot control signal, corresponding to a setpoint tire pressure, for the relay valve, the method comprising the acts of:

in an event of a low actual tire pressure and/or a high setpoint tire pressure in an initial phase of an aeration of the tire predefining by an electronic control unit a higher pressure than the setpoint tire pressure in order to accelerate the aeration; and in the event of a high actual tire pressure and/or a low setpoint tire pressure at a start of a venting of the tire, predefining a lowest possible pressure above a switch-off pressure of a wheel valve by the electronic control unit in order to accelerate the venting.

2. The method according to claim 1, wherein
an initial increase or decrease with respect to the setpoint tire pressure which is to be set is predefined based on a characteristic curve stored in the electronic control unit or formed therein.

3. The method according to claim 2, wherein
the electronic control unit performs signal processing of both the tire pressure measured with a pressure sensor and further measurement signals, originating from an on-board pneumatic system, for determining the pneumatic pilot control signal, and
an inflation time of the tire is calculated based on the signal processing in order to carry out aeration of the tire in a calculated time period.

4. The method according to claim 3, wherein
the electronic control unit newly calculates an inflation time after modification of the tire pressure and/or of the further measurement signals of the on-board pneumatic system.

5. The method according to claim 4, wherein
the electronic control unit prevents or interrupts the aeration if the evaluation of the further measurement signals of the on-board pneumatic system indicates that execution of a higher priority basic function of the on-board pneumatic system from the compressed air requirement of the tire inflation would be jeopardized.

6. The method according to claim 1, wherein
the increasing of the aeration or the decreasing of the venting of the tire is stopped by the electronic control unit if the tire pressure measured by a pressure sensor has reached at least 90% of the setpoint tire pressure.

7. The method according to claim 6, wherein the electronic control unit records a pressure profile plotted over time determined by the pressure sensor.

* * * * *